Figure 1:
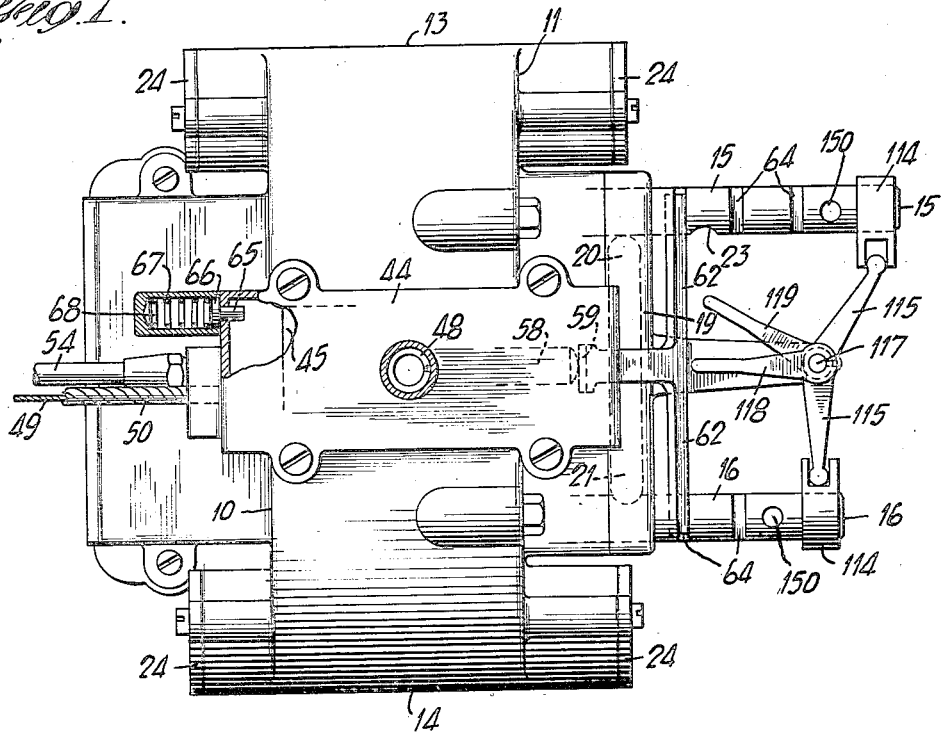

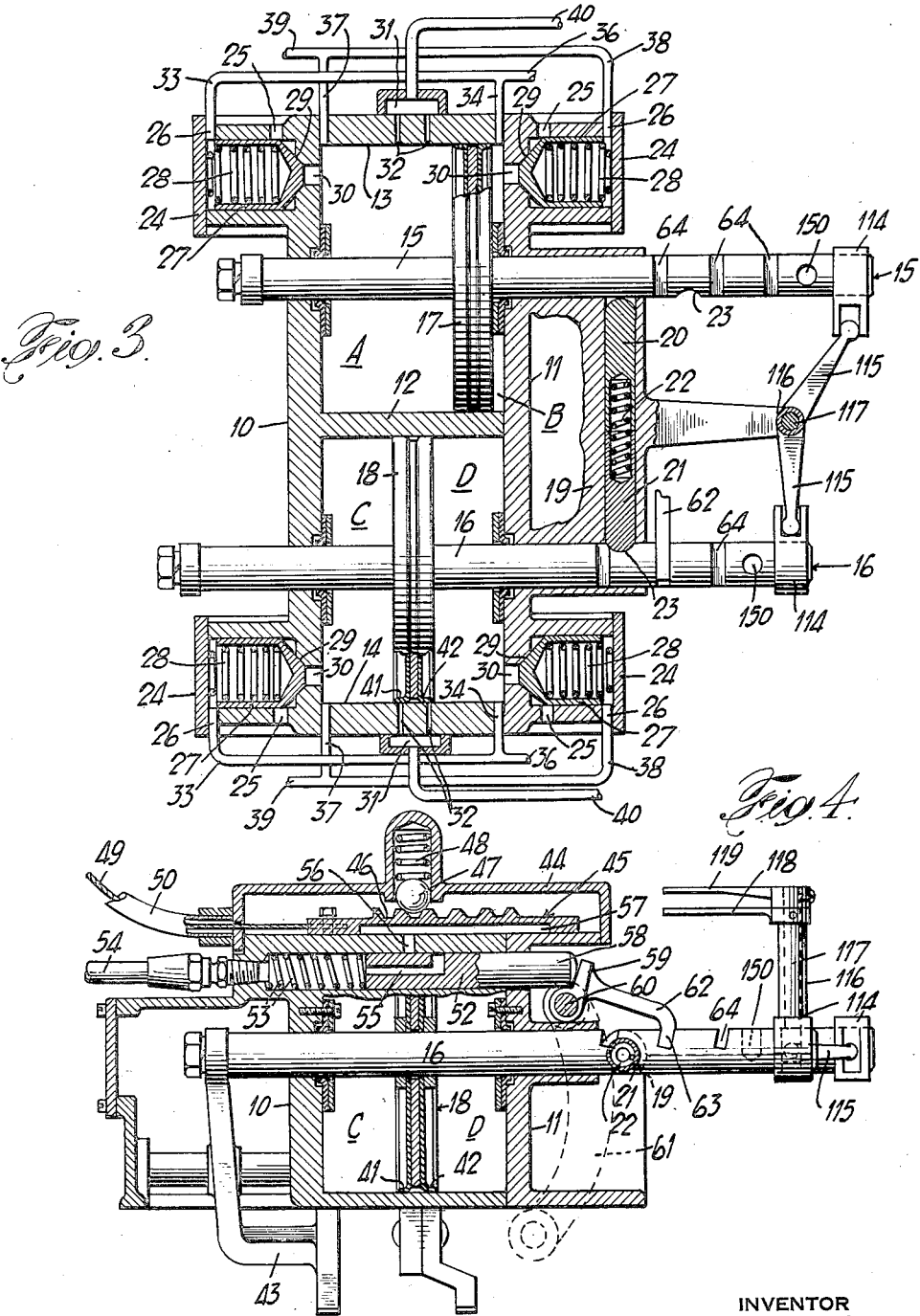

July 17, 1934.   D. F. LINSLEY   1,966,865
VACUUM OPERATED GEAR SHIFT MECHANISM
Filed April 11, 1932   3 Sheets-Sheet 3
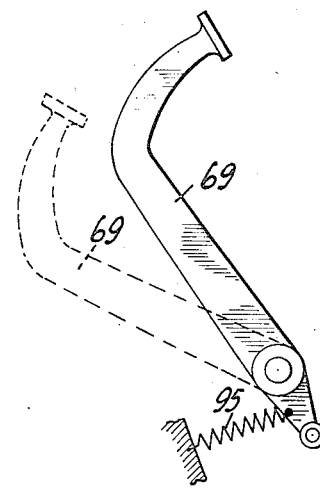
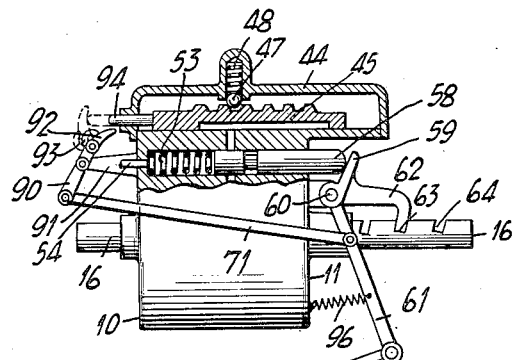
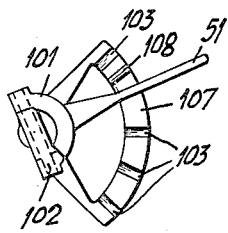
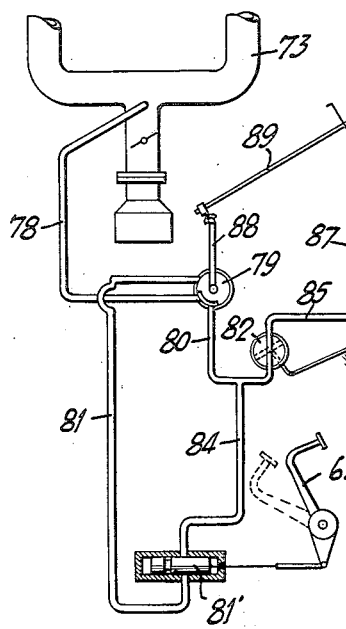
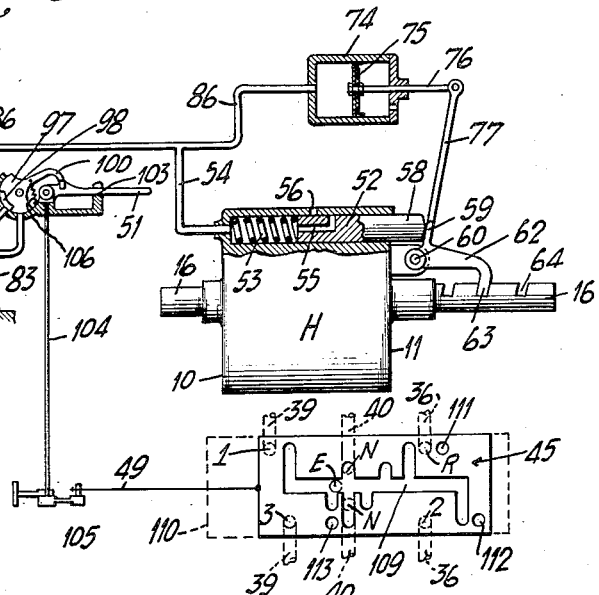
INVENTOR
Douglas F. Linsley
BY
Austin + Dix
ATTORNEY Patented July 17, 1934

1,966,865

UNITED STATES PATENT OFFICE 1,966,865

VACUUM OPERATED GEAR SHIFT MECHANISM

Douglas F. Linsley, Old Greenwich, Conn.

Application April 11, 1932, Serial No. 604,435

REISSUED

11 Claims. (Cl. 74—58)

This invention relates to a power transmission device involving an improved gear shifting apparatus and has particular reference to an automatic gear shifting apparatus operated substantially automatically by means of a source of vacuum.

One of the main objects of the invention is to provide a simple, compact, durable and efficient improvement in construction and operation of the device disclosed in my Patent No. 1,733,502 granted October 29, 1929 and entitled Vacuum operated gear shifter.

A further object resides in the provision of novel means whereby vacuum may be available to shift the gears but is not actually applied in such operation until the clutch has been disengaged at least to a predetermined extent.

A further object resides in the provision of simple and efficient means whereby the operation of the clutch not only controls the application of vacuum to the device but also operates a lock for certain of the shiftable parts which lock preferably is not released until just before the vacuum is to be applied and the gears shifted.

A still further object resides in the provision of a simple and efficient improvement of drift-lock for the shiftable piston rods which improves the action of their being latched in neutral position and of preventing the movement of one rod from neutral position until another rod already in gear engagement position has been restored to neutral.

Yet a further object resides in the provision of simple and efficient means whereby the movement of the shiftable element especially into gear engaging position is controlled by an improved construction of piston to soften the action of gear engagement and thereby avoid undue clashing of the gears when they are engaged.

A still further object is to provide an improved construction of manually controlled selector valve whereby as the valve is moved to high gear position, it is automatically returned to second gear position after the gears are engaged in high gear immediately upon release of the valve-controlling hand lever.

A still further object is to provide simple and efficient clutch operated means whereby the restoration of the vacuum selector valve from high gear position to second gear position takes place automatically when the clutch is let in after the valve has been manually moved to high gear position.

A further object is to provide a simple and efficient means whereby when the vehicle or power transmission is provided with free wheeling construction the control of the gear shift lock and the vacuum shut-off valve may be operated automatically by vacuum whenever the gear shift control lever is operated in a predetermined manner, but the application of vacuum not being effective even when said lever is operated, until the foot is taken off the accelerator pedal or the throttle in case the throttle is operated by hand. This same construction provides simple means whereby the system can be changed to the conventional system, placing the application of vacuum to the system under the control of the clutch, but still making the shifting of gears dependent upon the taking of the hand or foot off of the fuel supply device.

Another object is to provide a novel, simple mechanism whereby the gears may be shifted manually in emergencies when desired, and allows any of the gears in engagement to be manually moved back to neutral.

Further and more specific objects, features and advantages will more clearly appear from a consideration of the specification hereinafter taken in connection with the accompanying drawings which form part of the invention and which illustrate a present preferred form of the invention.

The invention briefly comprises the combination of a drive shaft, a source of vacuum such as the intake manifold of an internal combustion engine or its equivalent, a set of transmission gears, means actuated by the vacuum for shifting said gears, a clutch, and means for locking and unlocking the gear shift so that the vacuum may effect the shift.

In addition a further feature comprises a main vacuum control valve normally closed but opened by the operation of the clutch just after the shift lock is released by the clutch to permit the vacuum to be applied to the gear shift.

A further feature comprises means whereby the main vacuum control valve and the gear shift lock mechanism may be operated automatically by the vacuum instead of by the clutch, and are specially connected through a special valve controlled from the steering post or some other point convenient to the driver so that whenever the main selector valve is moved to establish a desired vacuum relation to shift gears the vacuum is applied to the mechanism operating the lock and the main control valve to open the control valve and release the lock and whereby these elements are restored to their shut and locked position whenever the control element is returned to any one of several normal positions. This particular construction is applicable to free wheeling but is provided with simple means under the control of the operator so that it can be transformed to the conventional system wherein the application of vacuum to the gear shift is primarily dependent upon the position of the clutch, but in any case is dependent upon the foot or the hand being released from the fuel supply element such as the hand throttle or the foot pedal.

A further feature comprises the combination of a source of vacuum, a drive shaft, a set of transmission gears, a clutch, and means for applying vacuum from said source to shift the gears together with a vacuum selector valve associated with the gear shifting mechanism to direct the vacuum as desired. This selector valve is controlled from a selector control lever on the steering post connected to the valve by a suitable wire or other connecting element. Simple spring operated means are associated with the valve, so that when the valve is moved to one particular position the above mentioned spring is put under pressure by engagement with the valve so as to automatically restore the valve to another position when the control lever is released. This applies to restoring the valve to second speed condition from high speed condition.

A further feature comprises the details of the construction of the slidable pistons in their cylinders and the gear shift casing so as to control the flow of air from one side of the piston to the other and soften or cushion the action of the gear engagement to avoid clashing.

Figure 2:
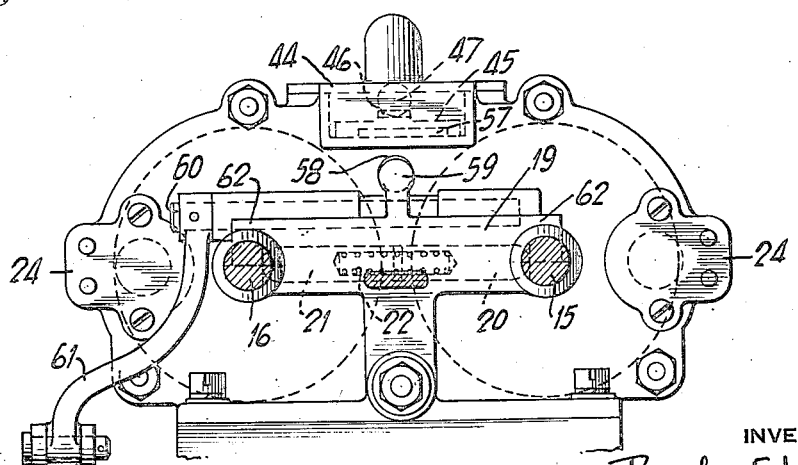

The present preferred form of the invention is illustrated in the drawings which form part of the specification and of which:

Fig. 1 is a plan view of the apparatus;
Fig. 2 is a rear end elevation thereof;
Fig. 3 is a horizontal cross-section;
Fig. 4 is a vertical cross-section through one of the cylinders;
Fig. 5 is a schematic representation of clutch operated means for returning the selector valve to predetermined position after being moved to high speed position upon the return of the clutch to engaged position;
Fig. 6 illustrates schematically the general system under free wheeling conditions of controlling the application of vacuum to the gear shift through the slidable selector valve and the manner in which the gear shift lock and the main vacuum control valve are automatically regulated through the movement of the manually operated control lever on the steering post; and
Fig. 7 is a top plan view of the hand operating lever and the quadrant over which it is moved.

The preferred form of the invention as shown in the drawings comprises a casing having front and rear walls 10 and 11 divided by a central wall 12 into two cylinders 13 and 14. Piston rods 15 and 16 project through the front and rear walls of said cylinders and extend suitable distances therebeyond. These piston rods respectively support pistons 17 and 18 thus dividing each cylinder into compartments A, B, C, and D.

At the rear of the casing a cross piece 19 is channelled to receive a drift lock formed of two bored bars 20 and 21, with the bores adjacent and receiving a spring 22 tending to force the bars 20 and 21 apart. The piston rods 15 and 16 are provided with notches or grooves such as 23 to receive the respective ends of this drift lock. The aggregate length of the drift lock rods 20 and 21 is equal to the distance between the bottom of one of the grooves 23 to the normal edge or surface of the other piston rod. As shown in Fig. 3 the drift lock is engaged in one groove and the other end of it is lightly bearing against the face of the other piston rod. When both piston rods are in the so-called neutral position as indicated by the piston 18 in Fig. 3, then the drift lock bars 20 and 21 will be spread apart by the spring 22 to simultaneously enter both notches or grooves 23 and latch the piston rods in the neutral position. Otherwise it will be observable from the condition shown in Fig. 3 that the piston rod 16 cannot be moved from its neutral position to any other position until the piston rod 15 has been restored to its neutral position. This prevents the movement of one rod to shift gears while the other rod is in a gear shifting position.

Adjacent each of the compartments A, B, C and D are disposed valve casings such as 24 each containing an air inlet port 25, a vacuum port 26, a cylindrical valve sleeve 27, a spring 28 pressing said valve on a seat 29 and a compartment inlet port 30 normally closed by the spring seating of the valve. Each of the cylinders 13 and 14 are provided with a neutral vacuum inlet chamber 31 connected to the respective cylinders by means of a pair of small passages 32 suitably spaced apart for a purpose hereinafter described. Pipe 33 connects the spring valve associated with compartment A, pipe 34 extends from compartment B and both pipes 33 and 34 are connected to a pipe 36. Pipe 37 extends from compartment A and pipe 38 extends from the spring valve chamber associated with compartment B. Pipes 37 and 38 are connected to a common pipe 39. The same relative arrangement of pipes is shown in connection with cylinder 14. The neutral vacuum inlet chambers 31 are connected to pipes 40.

The pipes 36, 39 and 40 above mentioned lead to a vacuum selector valve and connect thereto in any suitable manner to be later described so that the control of the vacuum or atmospheric air to any of these pipes is controlled in any well known manner by the movement of this selector valve.

Each of the pistons 17 and 18 are constructed in any desired manner, but in any event are provided preferably with cylinder engaging bevelled or sloping leather disks such as 41 and 42. Referring to piston 18 and considering the vacuum ports 32 in the cylinder 14, when the movement of the selector valve places vacuum in compartment C and admits air pressure to compartment D the piston 18 will move to the left. As the right hand port 32 is uncovered air will enter through said port into the vacuum chamber 31 and will then pass through in port 32 and press against the bevelled leather lip 41 which will allow a certain small amount of air to leak through into compartment C thus reducing the vacuum in said compartment and slightly slowing up the movement of the piston 16. Since the piston 16 is connected to a dependent yoke member such as 43 (see Fig. 4) whereby certain gear elements are shifted and since this leak of air above described tends to slow up the movement of the piston, these actions are so designed and correlated that this softening or slowing up occurs just as the gear elements are about to be engaged whereby the engagement of the gears is softened and undue clashing of the gears is avoided. It will be obvious from a consideration of the construction that this softening action applies when either piston is moved in either direction to engage the gears.

On top of the casing surrounding the cylinder just described there is disposed a valve casing 44 in which is disposed a slidable control vacuum selector valve 45 provided with any suitable ports and passages, not shown in detail except in Fig. 6. The back of this valve is provided with notches 46 respectively engaged by a ball 47 pressed thereinto by a spring 48, to latch the valve in any one of several predetermined positions. This valve 45 is manually operated preferably by means of Bowden wire 49 passing through a flexible tube 50 and leading to a manually controlled lever shown as 51 in Fig. 6, preferably located on the steering post of an automobile, or in any suitable position adjacent the hand of the operator.

Below the chamber of the selector valve 45 the valve casing is chambered to receive a main vacuum control valve 52 held in the position shown in Fig. 4 by means of a spring 53. The chamber in which this valve 52 operates is connected by a pipe 54 leading to any suitable source of vacuum which may be the intake manifold pipe of an internal combustion engine. A port 55 in the control valve 52 is adapted to be connected to a similar port 56 in the valve casing above the valve 52 leading to a chamber 57 in the selector valve 45 immediately thereabove. In the normal position of the control valve 52 these ports are not engaged (as shown) so that normally the vacuum is not made available to the control of the selector valve 45. The control valve 52 has an end 58 extending from this casing and engageable by a lug 59 mounted on a shaft 60 and tiltable therewith. The shaft 60 supports a lever 61 connected in any suitable manner, see Fig. 5, to a clutch mechanism so that whenever the clutch is moved to be disengaged the lug 59 is swung upwardly to move the control valve 52 to a position against the action of spring 53 so as to register the ports 55 and 56 and allow vacuum to be placed under the control of the selector valve 45. The shaft 60 also supports a lock bar 62 which as shown in Fig. 1 is of sufficient width to extend over the rearward extension of both piston rods 15 and 16. This lock bar has a depending lower edge 63 adapted to be engaged in any one of three notches such as 64 in the respective piston rods. These notches 64 and the piston rods are disposed in such combination with said rods that they are beneath the lock bar 62 to be engaged thereby whenever the respective piston rods are in gear engaging positions or in the neutral position. This lock bar 62 may be formed integral with the lug 59 and operated therewith by the action of the clutch as above mentioned.

As shown in Fig. 1 the front end of the casing of the selector valve 45 receives an inwardly extending stud 65 having a head 66 slidable in the casing 67 and receiving pressure from a spring 68 tending to hold the stud 65 in projected position in the valve casing. The length of this stud and its projection into the valve casing is such that when the valve 45 is pulled to the left by the movement of the Bowden wire 49 it will be disposed abutting the end of the stud 65 when the valve is in the so-called second gear position. Further movement of the valve to the left by the Bowden wire causes the valve to move from the second gear position to high gear position while tending to move the stud 65 to the left against the action of spring 68. However, as soon as the hand of the operator is removed from the manually controlled selector lever 51 when it is moved to the high speed position, this lever is moved back to second speed position by the operation of the spring 68 and the stud 65 moving the valve 45 back to second speed position and consequently moving the Bowden wire and the lever 51. This provides a simple means whereby the selector lever 51 and the selector valve 45 are automatically returned to second speed position from high speed position when the hand of the operator is removed from the selector lever 51. This insures that when the mechanism is in high speed the valve elements automatically have been returned to second speed so that to get into second speed from high speed with this arrangement it is merely necessary to throw out the clutch which will cause the lug 59 to move the control valve 52 and apply vacuum to the selector valve mechanism whereby vacuum and atmospheric air selectively controlled by said valve in the second gear position will automatically shift the gear to the second position. This arrangement is preferred although the improved device herein may be successfully operated without it.

Another method whereby the control selector valve 45 is automatically returnable to second speed position from high speed position, but in this case by means of the clutch action instead of the action of stud 65, is shown in Fig. 5 in which the clutch pedal 69 is connected through the lever 61 by a link 70 to the lever 71. The link 70 is made in two pieces one of which is bored to receive the end of the other portion of the link and in which bore is a spring 72 pressing against the end of the link element projecting into said bore. The lever 71 is connected to a lever 90 pivotally supported from the gear shift casing by means of a bracket 91. The other end of this lever 90 has a pawl 92 engageable by a spring 93 which tends always to move it to the left or counter-clockwise around its pivot. In the position shown in Fig. 5, with the clutch pedal in the full line position and the clutch engaged the pawl 92 lies under the edge of a stud 94 projecting through the end of the valve casing 44 and preferably connected to the front end of the selector slide valve 45. The slide valve 45 is shown in the second speed position. To move it to the high speed position it has to be moved to the left which would project the stud 94 to the dotted line position shown in the figures. This movement of the valve is, of course, effected by means of the Bowden wire 49. With the valve 45 in this high speed position whenever the clutch pedal 69 is depressed to disengage the clutch the lever system shown will move the lever 90 counter-clockwise around its pivot causing the pawl 92 to move to the left and snap up in back of the stud 94 by reason of the pull of the spring 93 and assume the dotted line position shown in Fig. 5. Consequently with the pawl 92 in this position whenever the clutch pedal is released so that the spring 95 may move it back to the engaged position then the spring 96 is strong enough to pull the lever 61 to the left and through it move the lever 90 to the right forcing slide valve 45 to the right to the second speed position. In this second speed position the pawl 92 will clear the end of the stud 94 and move to the position shown in full lines in Fig. 5. It is, of course, to be observed that as this action takes place the clutch lock bar 62 and the main vacuum control valve 52 are also actuated in the manner described previously.

In Figs. 3 and 4 are shown collars 114 on the ends of the piston rods 15 and 16. The collars by yoke construction connect respectively to the ends of arms 115 one of which is mounted on a sleeve 116 the other of which is mounted on a shaft 117 extending up through the floor of the car and having on their upper ends respectively arms 118 and 119. These arms can therefore be manually operated to shift either one or the other of the desired piston rods to effect the gear shift changes desired or to throw the gears into neutral position. Preferably these manually operable arms are mounted so as not to be in the way of the feet of the occupants of the car. If desired this manual operating means may be positioned at either end or elsewhere on the device. The piston rods are also provided with apertures 150 near their ends to enable the operator to insert a screw-driver or other pointed instrument to enable him to thereby shift the gears manually, if and when the apparatus is not provided with the above described arms for manual shifting.

In the systems now in use some of them are provided with free wheeling construction in which the clutch is not used and the engine is automatically disconnected from the car whenever the power is not being supplied to the engine through the hand lever or foot pedal accelerator. In such cases, it becomes desirous to provide a construction which will permit the gear shift to be unlocked and the vacuum shut-off valve to be operated to apply the vacuum without being dependent upon the clutch operation. To this end I have provided a system in which the vacuum is applied to the shift lock to release it and to open the vacuum control valve whenever the vacuum control lever on the steering post is operated to change gears, but insuring that this operation of applying vacuum to the gear shift is in all cases dependent upon the position of the fuel supply lever or pedal so that in any free wheeling construction the gears cannot be moved when power is being fed to the engine. In this connection also I have provided a simple dash device controlled by the operator whereby the system can be changed to the conventional system so that the application of vacuum to the shift is placed under the control of the clutch position, but still dependent upon the fact that the foot is off the accelerator or the hand is off of the hand throttle.

In this system there is shown a source of vacuum such as the manifold intake pipe 73 of an engine; the gear shifter device H of the type just described; the selector control lever 51; a vacuum cylinder 74 containing a piston 75 and a piston rod 76 connected by a link 77 to the lug 59 and the lock bar 62 previously discussed. The manifold 73 is connected by a pipe 78 to a two-way valve 79 adapted in one position to connect pipes 78 and 80 and in another position to connect pipes 78 and 81. Pipe 80 leads to a one way valve 82 controlled by the fuel supply element which may be the foot accelerator 83 or a hand throttle conveniently located. Pipe 81 leads to a valve 81' controlled by the clutch pedal 69. Another pipe 84 leads from the valve 83 to the pipe 80.

The mechanism on the steering post, in any form of the invention comprises the selector control lever 51. In the form of the invention shown in Fig. 6, which relates particularly to free wheeling, this lever 51 is associated with a rotary valve 97 having a port 98 broad enough to connect the pipe 85 with the pipe 86 when in the position shown in the figure. This pipe 86 is connected to the vacuum cylinder 74. The port is also adapted to connect the pipe 86 with the pipe 87 when the valve 97 is moved to another position and this pipe 87 is connected to the atmosphere. In this form of the invention the pipe 54 already described connects with the pipe 86 instead of directly to the intake manifold as previously mentioned. The two-way valve 79 is operated by a link 88 connected to a rod 89 leading to and operated from the dash board by the driver. The valve 97 has an arm 100 connected thereto and resting on top of the lever 51. This lever has a yoke 101 thereon pivoted on a shaft 102 so that the lever 51 can be lifted out of any one of the notches 103 and moved laterally to move the vertical shaft 104 to which it is connected (see Fig. 7). The shaft 104 has an arm 105 at its lower end connected to the Bowden wire 49. A spring 106 connects with the valve 97 to hold it in the position shown in full lines. The quadrant 107 on which the lever 51 slides is provided with a raised lug 108 between the neutral and reverse notches of the lever 51 as shown in Fig. 7. This is to prevent the driver from carelessly sliding the lever into reverse position without lifting it considerable above the quadrant and thus avoids careless operation of the lever 51.

From this figure and the construction just described it will be seen that with the valve 79 in the position shown the vacuum will be transmitted through pipes 78 to pipe 80 and to pipe 85 when the valve 82 is open, which occurs when the foot or hand is off the fuel control element 83. Thereafter when the lever 51 is lifted from a notch the valve 97 is operated and transmits vacuum to pipe 86 to cylinder 74 and the chamber of the valve 52. Therefore the lock 62 is released and the valve 52 moved to open position. This action is thus independent of the clutch and is adapted for free wheeling arrangements.

However, by moving the rod 89 to another position through dash manipulation, the valve 79 can be moved to connect pipes 78 and 81 which will throw the vacuum through the clutch controlled valve 81' and the vacuum will not reach pipe 84 and the valve 82 until the clutch is depressed. In either of these cases, however, it is to be noted that the vacuum cannot operate the shift device until the fuel control element is released by the hand or the foot.

For the purpose of making the operation of the valve 45 clear it has been shown in Fig. 6 schematically as being separated from the gear shift casing H, although as noted in Figs. 3 and 4 it is disposed on top of the casing just above the control valve 52. The port 56 is identical with engine port E shown in Fig. 6 on the diagram layout of slide valve 45 so that whenever the control valve 52 is moved to the open position, vacuum is applied to this port 56 and the valve seat through the pipe 54.

With the valve shown in the full line position in the figure it will be noted that the valve 45 is provided with an irregular port 109 shown in full line and has a longitudinal portion and several lateral off-set portions. In the valve seat 110 indicated in the dotted line below the slide valve 105 there are formed several ports indicated as follows: No. 1, a port leading to the first gear compartment of the shift; No. 2, a port leading to the second gear compartment; No. 3, a port leading to the third or high gear compartment; R, a port leading to the reverse gear compartment; two ports N leading to the neutral compartments 31 shown in the other figures. The valve 45 is also provided with apertures 111, 112, and 113 extending therethrough and constituting air passages. Extending from these ports R, 1, 2, 3 and the two N ports are pipes as follows which correspond to the pipes previously mentioned with respect to the description of Fig. 3; pipe 40 leading from the N ports to the neutral chambers 31, pipes 39 extending from ports 1 and 3 to the respective first and third gear chambers as shown in Fig. 3; and pipes 36 extending respectively from the reverse and second gear ports to the corresponding compartment of the shift as shown in Fig. 3.

In the full line position of the valve 45 shown in the drawings the two neutral ports are connected directly to the vacuum port E and consequently the two pistons of the shift are either in or will be moved into the neutral position in a manner previously described. Moving the valve 45 to the left one step will connect port 1 with the vacuum channel and the port E and will close the upper neutral port but allow the lower neutral port to remain connected to the vacuum. It will also cause the reverse chamber port R to be connected to atmosphere passage 111. In this position, therefore, vacuum will be applied through the pipe 39 to the first gear compartment and atmosphere will be applied to the reverse gear compartment which is on the opposite side of the piston 17, for instance. By having the lower neutral port also supplied with vacuum the other piston 18 is held in neutral position.

Moving the slide valve 45 further to the left will shut off port 1 but will connect port 2 to the vacuum, closing the lower neutral port but connecting the upper neutral to the vacuum, at the same time the third gear compartment through the port 3 is connected to the atmosphere through passage 113. Moving the slide valves further to the left the third gear position is obtained in which the upper neutral port is connected to the vacuum together with the third gear compartment through the port 3 and the port 2 is connected through passage 112 to the atmosphere. In this manner, it will be observed that in the neutral position only the neutral ports N are connected to the vacuum so that both pistons are drawn to their neutral position. For any other position of the valve in which a connection is made to one of the compartments of the shift to apply vacuum thereto it will be noted that the compartment on the other side of the piston from said compartment is connected to the atmosphere so as to assist in the operation of the device while at the same time, the other piston unit which is not being moved is connected to the vacuum so as to tend to hold it in the neutral position.

From this operation it will be observed that as soon as the control lever 51 is moved to a desired lateral position the slide valve 45 has assumed any one of the positions described and the proper connections are made and at the same time the control valve 52 is opened and the lock 62 released. As soon as the lever 51 is allowed to drop into its proper notch the valve 97 is actuated to cut off the vacuum from the cylinder 74 and connect it to the air which will cause the control valve 52 to be disengaged and the lock applied. In order to shift gears, therefore, it is necessary to move the lever 51 to the desired position and then hold it out of its notch in this position, long enough for the gears to be shifted by the vacuum.

From the construction described with reference to Figs. 3 and 4 it will be noted that piston 18 is in the neutral position and piston 17 is in a gear engaging position. If another gear change is to be made the control lever 51 is moved to the position desired.

Assuming that this position is such that it is desired to move piston 18 to the left. In order to do this suction must be applied to compartment C and air pressure to compartment D. Before the piston 18 can move, however, the piston 17 must be returned to neutral position. Consequently pipe connections are such that when the control lever is moved to this desired position, vacuum is applied to the chamber 31 connected to cylinder 13, applying a vacuum to the compartment A through the pipe 40. This will cause the piston 17 to start to move to the left. It will keep moving to the left until both ports 32 are covered whereupon it will stop. As it gets to this position the drift bar 20 will spring into engagement with the groove 23 on the piston rod 15 and this rod will then be latched in neutral position.

The movement of the control lever 51 to effect the desired change has connected vacuum to the compartment F through pipe 37 and vacuum to the back portion of the spring pressed valve associated with compartment D. This will cause this valve to be unseated and admit air into compartment D through its air inlet port 30. At the same time the position of the control lever has applied atmospheric air through pipe 34 to compartment D and through pipe 33 to the back of the spring pressed valve associated with compartment C, thus tending to keep said valve firmly seated. With these connections made, the piston 18 will commence to move to the left immediately after the piston 17 has been restored to neutral. This is possible because engagement of lock bar 20 in the notch 23 will expand the drift lock sufficiently to permit the lock bar 21 to be moved from its notch 23 and allow the piston 16 to move. As the piston moves to the left from the neutral position shown in Fig. 3 the air in compartment D will pass through port 32 into the chamber 31 and will enter through the left port 32 and press against the leather lip 41 of the piston moving it sufficiently to cause some of the air to leak into compartment C thus causing the vacuum to decrease therein, reducing the difference in pressure between the two compartments just before the desired gears are engaged and thereby softening the shock of engagement and avoid undue clashing of gears. Under the action of the vacuum the piston will continue its movement until the gears are fully engaged.

Setting of the control lever, of course, does not move the gears but merely sets the selector valve 45. The gears are not moved until the clutch pedal has been pressed down to its fully disengaged position in which position the connection between the clutch and the lug 59 and the lock bar 62 has caused the lock bar to be released from the piston rods and the lug to move the control valve 52 so as to connect ports 55 and 56 and allow the vacuum through pipe 54 to be applied to the chamber of the selector valve 45. This particular shift of gears having been effected the clutch may then be released which will automatically allow the piston rods to be locked by the re-engagement of the lock bar 62 therewith and will permit the control valve 52 to be disengaged through action of spring 53 and move to the position shown in Fig. 4.

It will be apparent that when the selector valve 45 is moved to the high speed position and the clutch is operated, that the high speed shift is made in the manner above described, the position of the valve determining the compartment to which vacuum and atmospheric air pressure are to be respectively applied. In this case the construction of stud 65 shown in Fig. 1 or the construction shown in Fig. 5 may be employed to automatically restore the selector valve to the second speed position as shown when either the hand is taken off the control lever 51 or the clutch pedal is moved back to fully engaged position.

It is further to be noted that when free wheeling is employed, that the construction shown in Fig. 6 is used and the shift is made by moving the lever 51 from one position to another but then only if and when the foot or hand is lifted from the throttle element 83. With the conventional arrangement without free wheeling and using the clutch, the change from one type of system to the other is effected by shifting the rod 89 and then the clutch valve 83 controls the vacuum application but still dependent upon the position of the foot or hand throttle.

It will thus be observed that there is provided a novel, simple, compact, efficient mechanism whereby certain shiftable gear engaging elements can be moved selectively from one position to another to effect the desired changes merely by the application of vacuum and air pressure to the desired points in the system. In the preferred form there is shown a pair of reciprocating piston rods which are locked respectively in gear engaging position and which cannot be moved from said position until the system is in condition for such movement. There is correlated with the shiftable piston rods a rod lock actuated through the movement of the clutch and so related therewith that the lock is not released until the clutch is disengaged. There is also associated with said lock a valve controlling the application of vacuum to the gear shift so that vacuum is not available until the clutch has been disengaged and the lock released. There has been provided a construction of the piston with respect to certain neutral ports whereby the sharp difference of pressure between respective compartments is somewhat reduced just as the gears are engaging in order to avoid undue clashing. There has been provided means whereby when the gears are in high speed relation, it is merely necessary for the operator to depress the clutch pedal and then release it again in order to be automatically changed to second gear from high. Two forms of this construction have been shown.

There has been described a method whereby the vacuum control valve and the piston rod lock may be controlled by the vacuum and depend merely upon the position of the vacuum controlled selector lever. This construction is especially useful in free wheeling. These various modifications may be applied separately or together to the apparatus shown, with the exception of the two forms of construction for re-setting the selector valve to second gear position, which, of course, can only be applied one at a time to the apparatus.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. The combination of a source of vacuum, a drive shaft, transmission gears, means actuated by the vacuum for shifting said gears, a vacuum selector valve, means under the control of the operator to operate said vacuum selector valve, a spring device engaged by said valve and placed under compression when the valve is moved to high speed position by the manually controlled element whereby the valve is moved automatically to second speed position when the manually controlled element is released.

2. The combination with a source of vacuum, a drive shaft, transmission gearing and means actuated by the vacuum for shifting said gears, a vacuum selector valve, means for moving said valve under the control of the operator, a clutch, and means operated by the clutch to restore said valve to a predetermined position whenever the clutch is moved to engaging position.

3. The combination with a source of vacuum of a drive shaft, transmission gears, and means actuated by the vacuum for shifting said gears, a vacuum selector valve manually movable by the operator, a gear shift lock and a main vacuum control valve, mechanism for moving said vacuum control valve and said lock and means whereby the vacuum may be applied to move said lock and said control valve to predetermined positions whenever the manually operable element is moved by the operator from one predetermined position to another whereby the lock is released and the control valve is moved to open position as the manually operated element has moved from predetermined position to shift gears, and means whereby said lock and control valve are moved respectively to locked and shut-off position when the manually operated element is restored to any one of several predetermined positions.

4. In combination, a vacuum operated gear shifting device, a manually operated selector lever to control the application of vacuum to said shift, a clutch, a throttle element and a dash adjustment device, means for passing vacuum to the gear shift when the foot or hand is off the throttle device when the selector lever is moved from one position to another, but dependent upon the disposition of the dash adjustment in a particular predetermined position, and means operated by the movement of the selector lever to release the gear shift and permit the vacuum to enter the shift.

5. In combination, a vacuum operated gear shifting device, a manually operated selector lever to control the application of vacuum to said shift, a clutch, a throttle element and a dash adjustment device, means for passing vacuum to the gear shift when the foot or hand is off the throttle device when the selector lever is moved from one position to another, but dependent upon the disposition of the dash adjustment in a particular predetermined position, and means operated by the movement of the selector lever to release the gear shift and permit the vacuum to enter the shift, and means operated by the clutch when depressed to apply vacuum to the shift through the throttle controlled means and the selector lever-controlled means only when the dash adjustment device is in another predetermined position.

6. In combination, a vacuum operated gear shift, a clutch selector lever, a dash adjustment device, a throttle element, a valve operated by the clutch, a valve operated by the selector lever, a valve operated by the dash adjustment device, and a valve operated by the throttle element vacuum being transmitted through the clutch valve when the clutch is depressed, to the gear shift when the dash adjustment device valve is in one position, said vacuum being transmitted directly from the source of vacuum to the valve controlled by the throttle element when the dash adjustment valve is in another position.

7. In combination, a vacuum operated gear shift involving a selector lever for applying vacuum to the shift, and a fuel throttle element, means whereby the shift may be unlocked and placed in condition to receive vacuum when the selector lever is moved from one position to another, and means whereby the movement of the selector lever to apply vacuum to the shift is made dependent upon the position of the fuel throttle element.

8. In combination a vacuum operated gear shift, a lock for said gear shift, a vacuum shut-off valve in said gear shift, a valve operated by the selector lever, a source of vacuum, means whereby vacuum is transmitted to the shift whenever the selector valve is moved from one predetermined position to another, and means whereby vacuum is applied to the shift to open the shut-off valve and release the lock when the lever is so moved.

9. In combination a vacuum operated gear shift, a selector lever to be manually operated by the operator, a valve connected with said lever, said lever adapted to lie normally in notches on a quadrant disposed on the steering post of the car, a gear shift lock and a shut-off valve, means whereby the vacuum is transmitted through the valve operated by the lever when the lever is moved out of any of its notches, and means whereby when the lever is so operated, the vacuum will release the lock and open the shut-off valve, and a selector valve mechanically operated by the lateral movement of the lever from one notch to another to selectively predetermine the application of vacuum to the shift.

10. In a vacuum operated gear shift, a cylinder, a piston having a neutral position in the cylinder, said cylinder having spaced ports therein adjacent the neutral position of the piston, said piston having flexible lips of leather or similar material contacting with the cylinder walls, means whereby as the piston moves from neutral position fluid is introduced to one side of said piston and will pass from one of said ports as it is uncovered to and through the other port by way of said lips to enter the chamber on the opposite side of the piston whereby the movement of the piston under the influence of said fluid is somewhat checked.

11. In combination, a vacuum operated gear shift, comprising a cylinder, a piston therein, a piston rod, means connecting the piston rod with the gear elements to be shifted, the cylinder walls along which the piston moves being provided with ports so disposed with respect to the stroke of the piston and the dimensions of the piston as to cushion the movement of the piston in a given direction.

DOUGLAS F. LINSLEY.